(12) United States Patent
Toyoshima et al.

(10) Patent No.: US 6,448,336 B1
(45) Date of Patent: Sep. 10, 2002

(54) RESIN MODIFIER, RESIN COMPOSITION CONTAINING THE SAME, AND POLYAROMATIC VINYL RESIN COMPOSITION

(75) Inventors: Tetsuya Toyoshima; Koukichi Noguchi; Masao Nakamura, all of Kawasaki (JP)

(73) Assignee: Zeon Corp., Tokyo (JP)

( * ) Notice: Subject to any disclaimer, the term of this patent is extended or adjusted under 35 U.S.C. 154(b) by 0 days.

(21) Appl. No.: 09/719,642

(22) PCT Filed: Jun. 15, 1999

(86) PCT No.: PCT/JP99/03187

§ 371 (c)(1),
(2), (4) Date: Dec. 15, 2000

(87) PCT Pub. No.: WO99/65955

PCT Pub. Date: Dec. 23, 1999

(30) Foreign Application Priority Data

Jun. 15, 1998 (JP) ............................................. 10-183314

(51) Int. Cl.[7] ........................ C08F 36/06; C08L 101/00; C08L 47/00
(52) U.S. Cl. ........................ 525/191; 525/232; 525/240
(58) Field of Search ................................ 525/191, 232, 525/240

(56) References Cited

U.S. PATENT DOCUMENTS 5,728,782 A 3/1998 Brady et al.

FOREIGN PATENT DOCUMENTS

| JP | 6392620 A | 4/1988 |
| JP | 5155937 A | 6/1993 |
| JP | 8325330 A | 12/1996 |
| JP | 9151219 A | 6/1997 |
| JP | 9302035 A | 11/1997 |
| JP | 10298243 A | 11/1998 |

*Primary Examiner*—Nathan M. Nutter
(74) *Attorney, Agent, or Firm*—Birch, Stewart, Kolasch & Birch, LLP

(57) ABSTRACT

A conjugated diene polymer rubber composition for modifying a resin comprising a conjugated diene homopolymer or copolymer in which the content of cis-bond units in the total conjugated diene monomer units is at least 40%; the weight average molecular weight (Mw) is 20,000 to 10,000,000; and the Mw and the number average molecular weight (Mn) satisfy the formula: $\log(Mw/Mn) < 0.162 \times \log(Mw) - 0.682$, (i) A resin composition comprising a resin and the conjugated diene polymer rubber composition, and (ii) a polyaromatic vinyl resin composition prepared by polymerizing an aromatic vinyl monomer in the presence of the conjugated diene polymer rubber composition have balanced and good low-temperature resistance and surface luster.

9 Claims, No Drawings

RESIN MODIFIER, RESIN COMPOSITION CONTAINING THE SAME, AND POLYAROMATIC VINYL RESIN COMPOSITION

This application is the national phase under 35 U.S.C. §371 of PCT International Application No. PCT/JP99/03187 which has an International filing date of Jun. 15, 1999, which designated the United States of America.

BACKGROUND OF THE INVENTION (1) Field of the Invention

This invention relates to a high-cis conjugated diene polymer rubber composition to be incorporated in a resin for improving impact resistance and luster of the resin; a resin composition comprising the conjugated diene polymer rubber composition; and an impact-resistant poly-aromatic vinyl resin composition.

(2) Description of the Related Art

High-impact polystyrene resins (HIPS) are generally produced by polymerizing a styrene monomer in the presence of various unvulcanized rubbers by a bulk-solution or a bulk-suspension polymerization procedure. The thus-produced high-impact polystyrene resins have a structure such that rubber particles are dispersed in a matrix of the polystyrene resin, and therefore, the impact resistance of the hard and brittle polystyrene resin is improved. The high-impact polystyrene resins are inexpensive and have good processability and physical properties, and thus, have been widely used.

In recent years, high impact polystyrene resins are more and more widely used because of their good physical properties and processability. But, higher performances are still required for high impact polystyrene resins. The required performances are, for example, well balanced impact resistance and rigidity (i.e., modulus in flexure), enhanced low-temperature impact resistance, good appearance such as enhanced luster and reduced coloration, and enhanced resistance to thermal degradation. Further, it is required that, when a high impact polystyrene resin prepared by polymerizing a styrene monomer in the presence of a rubber as a modifier for the resin is incorporated with a polystyrene resin, the desired properties are not deteriorated or are deteriorated only to a very slight extent.

To provide a modifier for improving impact resistance and thermal resistance, an improved process for producing a polybutadiene rubber is proposed in Japanese Examined Patent Publication No. H4-14689 wherein butadiene is polymerized by using a special catalyst predominantly comprised of a rare earth metal compound to give a polybutadiene rubber having an extremely reduced 1,2-vinyl bond content and a relatively narrow molecular weight distribution. Another process for producing a polybutadiene rubber for a resin modifier is proposed in Japanese Unexamined Patent Publication No. H9-151219 wherein butadiene is polymerized in the presence of a catalyst having a special composition comprising a transition metal compound, an organic aluminum compound and water and in the co-presence of a specified amount of a molecular weight modifier and an ortho-ester to give a polybutadiene rubber having a large cis-1,4 bond content and a relatively narrow molecular weight distribution. These proposed processes provide high-impact polystyrene resins having a low-temperature impact resistance. However, the high-impact polystyrene resins have a molecular weight distribution which is not sufficiently narrow, and thus, their surface luster is not improved to a satisfied extent.

A further process for producing a polystyrene resin having an improved impact resistance is proposed in Japanese Examined Patent Publication No. H6-51768 wherein a polybutadiene rubber having a cis bond content of 15 to 35 mole % and a narrow molecular weight distribution as expressed by the ratio of Mw/Mn of 1.2 to 1.8, is produced by coupling polybutadiene with a coupling agent having at least three functionalities by using an organic lithium catalyst to a coupling degree of at least 50%. The polybutadiene rubber used has a narrow molecular weight distribution and thus results in a high-impact polystyrene exhibiting an enhanced surface luster, but, the polybutadiene rubber has a low cis-1,4 bond content, and therefore, the low-temperature impact resistance of the high-impact polystyrene resin is not improved to a sufficient extent.

DISCLOSURE OF THE INVENTION

An object of the present invention is to provide a modifier for a resin which is capable of highly improving the balance between low-temperature impact resistance and luster of the resin when the modifier is incorporated in the resin.

Another object of the present invention is to provide a resin composition comprising a resin having incorporated therein the above-mentioned modifier for the resin, which exhibits a highly balanced low-temperature impact resistance and surface luster.

A further object of the present invention is to provide a resin composition comprising a poly-aromatic vinyl resin and the above-mentioned modifier for the resin, which exhibits a highly balanced low-temperature impact resistance and surface luster.

As a result of extensive research for solving the problems of the prior art, the present inventors have found (i) that the above-mentioned objects are achieved by using a modifier for the resin, which is a high-cis conjugated diene polymer rubber composition comprising a specific conjugated diene polymer having a high cis-bond unit content and a small ratio (Mw/Mn) of weight average molecular weight (Mw) to number average molecular weight (Mn); (ii) that the high-cis conjugated diene polymer rubber composition for modifying a resin can give a resin composition having a highly balanced low-temperature impact resistance and a surface luster, when the high-cis conjugated diene polymer rubber composition is contained as a polymer elastomer ingredient in a thermoplastic resin such as a poly-aromatic vinyl resin; and further (iii) that a poly-aromatic vinyl resin composition having a highly balanced low-temperature impact resistance and a surface luster can be easily produced by subjecting the aromatic vinyl monomer alone or a mixture of the aromatic vinyl monomer with another monomer copolymerizable therewith to free-radical polymerization in the presence of the high-cis conjugated diene polymer rubber composition. Based on these findings, the present invention has been completed.

Thus, in one aspect of the present invention, there is provided a high-cis conjugated diene polymer rubber composition for modifying a resin comprising a conjugated diene polymer having a high cis-bond content, which is a polymer of a conjugated diene monomer or monomers alone or a copolymer of the conjugated diene monomer with a monomer copolymerizable therewith, and in which the content of units having a cis-bond in the total units derived from the conjugated diene monomer is at least 40%; the weight average molecular weight (Mw) is in the range of 20,000 to 10,000,000; the ratio (Mw/Mn) of weight average molecular weight (Mw) to the number average molecular weight (Mn) is smaller than 1.5; and the ratio Mw/Mn and the weight average molecular weight (Mw) satisfy the following formula (1):

$$\log(Mw/Mn) < 0.162 \times \log(Mw) - 0.682 \quad (1)$$

In another aspect of the present invention, there is provided a resin composition which comprises a resin ingredient and the above-mentioned high-cis conjugated diene polymer rubber composition.

In a further aspect of the present invention, there is provided a poly-aromatic vinyl resin composition which is prepared by polymerizing alone or an aromatic vinyl monomer in combination with a monomer copolymerizable by using the high-cis conjugated diene polymer as a modifier becomes poor. The ratio (Mw/Mn) is smaller than 1.5.

BEST MODE FOR CARRYING OUT THE INVENTION (i) High-Cis Conjugated Diene Polymeric Rubber A high-cis conjugated diene polymer rubber used in the present invention is a polymer of a conjugated diene monomer or monomers alone, i.e., a homopolymer of a conjugated diene monomer or a copolymer of conjugated diene monomers, or a copolymer of a conjugated diene monomer with a monomer copolymerizable therewith. The high-cis conjugated diene polymer rubber comprises preferably at least 40% by weight, more preferably at least 70% by weight and most preferably at least 90% by weight, of units derived from a conjugated diene monomer.

As specific examples of the conjugated diene monomer, there can be mentioned 1,3-butadiene, 2-methyl-1,3-butadiene, 2,3-dimethyl-1,3-butadiene, 2-chloro-1,3-butadiene, 1,3-pentadiene and 1,3-hexadiene. Of these, 1,3-butadiene is preferable. As specific examples of the monomers copolymerizable with the conjugated diene monomers, there can be mentioned aromatic vinyl monomers such as styrene, o-methylstyrene, p-methylstyrene, m-methylstyrene, 2,4-dimethylstyrene, ethylstyrene, p-tert.-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene and vinylnaphthalene; and non-conjugated dienes such as dicyclopentadiene, 5-ethylidene-2-norbornene and 1,5-hexadiene. These conjugated diene monomers may be used either alone or as a combination of at least two thereof.

The high-cis conjugated diene polymer used in the present invention is characterized in that the content of cis-bond in the total units derived from the conjugated diene monomer is at least 40%, preferably at least 80% and more preferably at least 90%. If the content of the cis-bond is too small, when a high-cis conjugated diene polymer is used for the preparation of a high-impact poly-aromatic vinyl resin, the low-temperature resistance of the high-impact poly-aromatic vinyl resin is poor. It is preferable that the conjugated diene monomer is 1,3-butadiene and the content of cis-1,4 bond in the total units derived from 1,3-butadiene falls in the above-mentioned range. There are no particular limitations for the types of bonds other than cis-bond, i.e., trans-bond and vinyl-bond.

The high-cis conjugated diene polymer used in the present invention has a weight average molecular weight (Mw) in the range of 20,000 to 10,000,000, preferably 50,000 to 5,000,000 and more preferably 100,000 to 3,000,000, as determined by gel permeation chromatography (GPC) using a calibration curve drawn on a standard polybutadiene. If the weight average molecular weight is too small, the high-cis conjugated diene polymer is liquid and is some cases difficult to handle. In contrast, if the weight average molecular weight is too large, the viscosity of the rubber solution increases in the step of preparation and thus invites a problem in the production process.

In the high-cis conjugated diene polymer used in the present invention, the following formula (2) between the weight average molecular weight (Mw) and the ratio (Mw/Mn) of weight average molecular weight (Mw) to the number average molecular weight (Mn) is satisfied when A=0.162 and B=0.682:

$$\log(Mw/Mn) < A \times \log(Mw) - B \quad (2)$$

Formula (2) is preferably satisfied when A=0.161, more preferably when A=0.160, and most preferably when A=0.159. Further, Formula (2) is preferably satisfied when B-0.684, more preferably when B=0.687, and most preferably when B=0.690.

In the high-cis conjugated diene polymer used in the present invention, a too large ratio (Mw/Mn) of weight average molecular weight (Mw) to number average molecular weight (Mn), relative to the particular weight average molecular weight (Mw), is not preferable because surface luster of a poly-aromatic resin made by using the high-cis conjugated diene polymer as a modifier becomes poor. The ratio (Mw/Mn) is preferably not larger than 1.9, more preferably not larger than 1.7, and most preferably not larger 1.5.

(ii) Process for Producing Conjugated Diene Polymer

A process for producing the conjugated diene polymer used in the present invention is not particularly limited. For example, the conjugated diene polymer is produced by carrying out polymerization in the presence of a catalyst comprising (A) a compound of a transition metal of group IV of the periodic table having a cyclopentadienyl structural unit having a carbonyl group or a sulfonyl group as a substituent, and (B) an aluminoxane or (C) an ionic compound capable of reacting with the transition metal compound (A) to give a cationic transition metal compound.

The above-mentioned transition metal compound (A) with a cyclopentadienyl structural unit having a carbonyl substituent or a sulfonyl substituent is preferably a compound of a transition metal of group IV of the periodic table represented by the following formu;a (3):

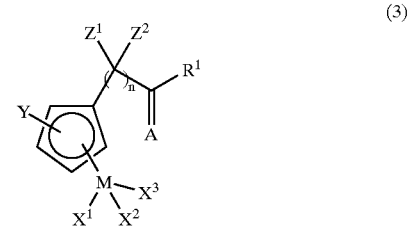

(3)

wherein M is a transition metal of group IV; $X^1$, $X^2$ and $X^3$ are hydrogen, a halogen, a C1–12 hydrocarbon group or a C1–12 hydrocarbon-oxy group; Y is hydrogen or a C1–20 hydrocarbon group which may form a ring together with the cyclopentadienyl group; $Z^1$ and $Z^2$ are hydrogen or a C1–12 hydrocarbon group; A is oxygen or sulfur; $R^1$ is hydrogen, a C1–12 hydrocarbon group or a C1–12 hydrocarbon-oxy-group; and n is an integer of 0 to 5.

The transition metal compound of formula (3) is preferably a metallocene compound having as a ligand one cyclopentadienyl group or cyclopentadienyl group with a substituent such as an alkyl, aryl or cycloalkyl group, or fused cyclic substituents. The cyclopentadienyl group as a ligand has an atomic group having a structural unit represented by >C=O or >C=S as a substituent. The transition metal (M in formula (3)) of group IV of the periodic table is preferably Ti, Zr or Hf, and more preferably Ti, As preferable examples of $X^1$, $X^2$ and $X^3$, there can be mentioned halogens such as chlorine; hydrocarbon groups including alkyl groups such as methyl and neopentyl, and aralkyl groups such as benzyl; and hydrocarbon-oxy groups including alkoxy groups such as methoxy, ethoxy and isopropoxy, and aralkyloxy groups such as benzyloxy. Of the hydrocarbon-oxy groups, an alkoxy group is preferable. As specific examples of Y, there can be mentioned hydrogen, alkyl groups such as methyl, ethyl, propyl, isopropyl, butyl and t-butyl, aryl groups such as phenyl, and aralkyl groups such as benzyl. Y may include a hydrocarbon group containing a silicon atom, such as trimethylsilyl. Y connected to the cyclopentadienyl ring may form, together with the cyclopentadienyl group, a polycyclic group, for example, indenyl and fluorenyl groups.

As specific examples of $Z^1$ and $Z^2$, there can be mentioned hydrogen, alkyl groups such as methyl, ethyl, propyl, isopropyl, butyl and t-butyl, aryl groups such as phenyl, and aralkyl groups such as benzyl. $R^1$ includes hydrogen, hydrocarbon groups and hydrocarbon-oxy groups. As specific examples of the hydrocarbon groups, there can be mentioned alkyl groups such as methyl, ethyl, propyl, isopropyl, butyl and t-butyl, aryl groups such as phenyl, and aralkyl groups such as benzyl; and, as specific examples of the hydrocarbon-oxy groups, there can be mentioned alkoxy groups such as methoxy, ethoxy, propoxy, isopropoxy, butoxy and t-butoxy, aryloxy groups such as phenoxy, and aralkyloxy groups such as benzyloxy. Of these, alkoxy groups are preferable as hydrocarbon-oxy groups, and n is preferably 1 or 2, and more preferably 1.

As specific examples of the compound (A) with a transition metal of group IV of the periodic table represented by the formula (3), there can be mentioned those which are represented by the formulae: MeO(CO)CH2CpTiCl$_3$, MeO(CO)CH(Me)CpTiCl$_3$ and (3-[MeO(CO)CH$_2$](1-Me)CpTiCl$_3$, wherein Me is a methyl group and Cp is a cyclopentadienyl group.

The procedure by which the transition metal compound (A) represented by the formula (3) is prepared is not particularly limited. For example, MeO(CO)CH$_2$CpTiCl$_3$ can be prepared by the procedure described in *Macromol. Symp.*, 1997, vol. 118, p55–60.

An aluminoxane used in combination with the compound (A) with a transition metal of group IV of the periodic table, is a straight-chain or cyclic polymer, which is an organic aluminumoxy compound and is represented by the following formula (4):

$$(-Al(R^2)O-)_n \qquad (4)$$

wherein $R^2$ is a C1–10 hydrocarbon group, which includes, for example, alkyl groups such as methyl, ethyl, propyl and isobutyl. Of these, methyl is most preferable $R^2$ may have a substituent such as halogen and/or an $R^3O$ group wherein $R^3$ is a C1–10 hydrocarbon group, which includes, for example, alkyl groups such as methyl, ethyl, propyl and isobutyl. Of these, methyl is most preferable, and n is a degree of polymerization, and at least 5, preferably at least 10.

As specific examples of the ionic compound (C) capable of reacting with the transition metal compound (A) to form a cationic complex, there can be mentioned ionic compounds which are a combination of tetrakils (pentafluorophenyl) borate anion with an amine cation having an active proton such as, for example, $(CH_3)_2N(C_6H_5)H^+$, a tri-substituted carbonium cation such as $(C_6H_5)_3C^+$, a carborane cation, a metal carborane cation or a transition metal-having ferrocenium cation.

The catalyst of the present invention may be used, for polymerization of a conjugated monomer, in combination with a hydrogenated metal compound, an organic metal compound containing a main-group metal element of groups I, II and III of the periodic table, an organic metal halide compound and a hydrogenated organic metal compound.

Specific examples of the hydrogenated metal compounds include NaH, LiH, CaH$_2$, LiAlH$_4$ and NaBH$_4$. Specific examples of the main-metal group-containing organic metal compounds include methyllithium, butyllithium, phenyllithium, dibutylmagnesium, trimethylammonium, triethylaluminum, triisobutylaluminum, trihexylaluminum and trioctylaluminum. Specific examples of the organic metal halide compounds include as ethylmagnesium chloride, butylmagnesium chloride, dimethylaluminum chloride, diethylaluminum chloride, sesquiethylaluminum chloride and ethylaluminum dichloride. Specific examples of the hydrogenated organic metal compounds include diethylaluminum hydride and sesquiethylaluminum hydride.

The transition metal compound (A) and/or the ionic compound (C) can be used in a form supported by a carrier. The carrier includes inorganic compounds and organic polymers.

The inorganic compounds preferably include inorganic oxides, inorganic chlorides and inorganic hydroxides. The inorganic compounds may contain a minor amount of carbonate salts or sulfate salts. As preferable specific examples of the inorganic compounds, there can be mentioned inorganic oxides such as silica, alumina, magnesia, titania, zirconia and calcia. These inorganic oxides are preferably in the form of finely divided porous particles having an average particle diameter of 5 to 150 μm and a specific surface area of 2 to 800 m²/g. The porous particles may be heat-treated, for example, at a temperature of 100 to 800° C. to remove volatile compounds.

The organic polymers preferably include those which have as a side chain an aromatic ring, a substituted aromatic ring, or functional groups such as hydroxyl, carboxyl, ester and halogen. As specific examples of the organic polymers, there can be mentioned homopolymers and copolymers of α-olefin such as ethylene, propylene and butene which have a functional group introduced therein by chemical modification and copolymers of ethylene, propylene or butene; and homopolymers, copolymers and chemically modified polymers thereof of monomers such as acrylic acid, methadrylic acid, vinyl chloride, vinyl alcohol, styrene and divinylbenzene. The organic polymers are preferably in the form of finely divided spherical particles having an average particle diameter of 5 to 250 μm. When the transition metal compound (A) and/or the ionic compounds (C) are supported by these carriers, deposition of the catalyst onto a polymerization reactor can be prevented.

The polymerization of a conjugated diene monomer or monomers alone or in combination with a copolymerizable monomer is carried by a method selected from the following methods (1) to (6) using a catalyst comprising the transition metal compound (A) and the aluminoxane (B) and/or the ionic compound (C).

(1) Component (A) is previously contacted with component (B) or component (C), and then the mixture is placed into contact with a monomer to conduct polymerization.
(2) Component (A) is previously contacted with a monomer, and then the mixture is placed into contact with component (B) or component (C) to conduct polymerization.

(3) Component (B) or component (C) is previously contacted with a monomer, and then the mixture is placed into contact with component (A) to conduct polymerization.

(4) A solution of component (A) and a solution of component (B) or component (C) are mixed together, the mixed solution is placed in contact with a carrier, the thus-formed supported catalyst is separated from the mixed solution, and then the supported catalyst is placed into contact with a monomer to conduct polymerization.

(5) A solution of component (A) is contacted with a carrier, the thus-obtained solution is then contacted with a solution of component (B) or component (C), and the thus-formed supported catalyst is separated from the mixed solution, and then the supported catalyst is placed into contact with a monomer to conduct polymerization.

(6) A solution of component (B) or component (C) is contacted with a carrier, the thus-obtained solution is then contacted with a solution of component (A), and the thus-formed supported catalyst is separated from the mixed solution, and then the supported catalyst is placed into contact with a monomer to conduct polymerization.

Of these procedures (1) to (6), from the aspect of enhancement of efficiency of polymerization initiator, polymerization activity and narrower molecular weight distribution, procedures (1), and (4) to (6) are preferable, wherein transition metal compound (A) and the aluminoxane (B) and/or the ionic compound (C) are previously contacted with each other, and, after a lapse of aging time, a monomer is placed. Procedure (1) is most preferable. By using this procedure, a conjugated diene polymer having a very low ratio (Mw/Mn) of weight average molecular weight (MW) to number average molecular weight (Mn) is easily obtained.

The transition metal compound (A), component (B) and component (C) may be used either in a state of a solution or a slurry, and may be in a different state from each other, unless otherwise described. The liquid medium used to form a solution or a slurry includes inert hydrocarbons such as butane, pentane, hexane, heptane, octane, cyclohexane, mineral oil, benzene, toluene and xylene; and halogenated hydrocarbons such as chloroform, methylene chloride, dichloroethane and chlorobenzene.

Contact of component (A), component (B) or component (C) with the monomer is usually carried out at a temperature range of −100° C. to +100° C. for 1 second to 180 minutes.

The amount of the catalyst used is such that the amount of the transition metal compound (A) is usually in the range of 100 to 0.001 milli-moles, preferably 10 to 0.01 milli-moles and more preferably 5 to 0.1 milli-moles, per mole of the monomer. When an aluminoxane is used as a component, the ratio by mole of aluminoxane/transition metal compound is preferably in the range of 10 to 10,000, more preferably 100 to 5,000. When the ionic compound is used as a component, the ratio by mole of ionic compound/transition metal compound is preferably in the range of 0.01 to 100, more preferably 0.1 to 10. Further, when an organic metal compound is also used, the ratio by mole of organic metal compound/transition metal compound is preferably in the range of 0.1 to 10,000, more preferably 1 to 1.000.

The polymerization of at least one kind of conjugated diene monomer, and the copolymerization of a conjugated diene monomer with a copolymerizable monomer are usually carried out in an inert hydrocarbon medium by solution polymerization, slurry polymerization, or bulk polymerization in which a monomer is used as a diluent. A vapor phase polymerization procedure using a vapor phase stirred reaction vessel or a vapor phase fluidized bed can also be employed. These polymerization procedures can be carried out at a temperature of −100° C. to +110° C. and a pressure of ordinary pressure to 30 kg/cm$^2$ for 1 second to 360 minutes. The inert hydrocarbon medium used includes those which are hereinbefore recited.

It is possible that a conjugated diene monomer is preliminary polymerized by the above-mentioned polymerization procedure, and, by using the thus-obtained polymer as a catalyst, a further conjugated diene monomer is polymerized. This procedure is advantageous for enhancing polymerization activity, keeping the form of a solid catalyst, making easy the operation of introducing a catalyst into a polymerization vessel for the further polymerization, preventing or minimizing the deposition of catalyst on a wall of the polymerization vessel, and enhancing the fluidity of the reaction mixture in a vapor phase polymerization vessel.

To control the molecular weight of a polymer, a chain transfer agent can be added. As the chain transfer agent, those which are conventionally used for the production of cis-1,4-polybutadiene are used. Arenes such as 1,2-butadiene and cyclic dienes such as cyclooctadiene are especially preferable, As a process for polymerizing conjugated diene monomers using the catalyst, there can be mentioned a continuous polymerization process, a semi-batch polymerization process and a batch polymerization process can be employed. To obtain a polymer with a low Mw/Mn ratio, a semi-batch polymerization process or a batch polymerization process is preferable, and a batch polymerization process is more preferable.

The termination of polymerization is usually carried out by adding an active proton compound such as alcohols, water, primary amines and secondary amines into the polymerization system when the predetermined conversion is reached. The alcohols used include, for example, methanol, ethanol, propanol, isobutanol and butanol.

After the termination of polymerization, an antioxidant, a neutralizing agent, a dispersing agent and others are added, according to the need, to a polymerization reaction mixture which is a rubber-like polymer solution.

The kind and amount of a stabilizer used, according to the need, in the present invention are not particularly limited. The antioxidant includes, for example, phenolic stabilizers, sulfur-containing stabilizers, phosphorus-containing stabilizers and amine stabilizers. The phenolic stabilizers are described, for example, in JP-A H4-252243. As specific examples of the phenolic stabilizers, there can be mentioned 2,6-di-tert.-butyl-4-methylphenol, 2,6-di-tert.-butyl-4-ethylphenol, 2,6-di-tert.-butyl-4-butylphenol, 2,6-di-tert.-butyl-4-isobutylphenol, 2-tert.-butyl-4,6-dimethylphenol, 2,4,6-tricyclohexylphenol, 2,6-di-tert.-butyl-4-methoxyphenol, 2,6-di-phenol-4-octadecyloxyphenol, n-octadecyl-3-(3',5'-di-tert.-butyl-4-hydroxyphenyl) propionate, tetrakis-[methylene-3-(3',5'-di-tert.-butyl-4'-hydroxyphenyl)-propionate]-methane. 1,3,5-trimethyl-2,4,6-tris(3,5-di-tert.-butyl-4-hydroxybenzyl)benzene, 2,4-bis-(octylthiomethyl)-6-methylphenol, 2,4-bis(2',3'-dihydroxypropylthiomethyl)-3,6-dimethylphenol and 2,4-bis(2'-acetyloxyethylthiomethyl)-3,6-dimethylphenol. As specific examples of the sulfur-containing stabilizers, there can be mentioned dilauryl thiodipropionate, distearyl thiodipropionate, aminothioglycolate, 1,1'-thiobis(2-naphthol), ditridecyl thiodipropionate and distearyl β,β'-thiodipropionate. The phosphorus-containing stabilizers are also known, and, as specific examples thereof, there can be mentioned tris(nonylphenyl)phosphite, cyclic neopentanetetraylbis-(octadecylphosphite) and tris(2,4-di-tert.-butylphenyl)-phosphite. As specific examples of the amine stabilizers, there can be mentioned phenyl-α-naphthylamine, phenyl-β-naphthylamine, aldol-α-naphthylamine, p-isopropoxy-diphenylamine, p-(p-toluenesulfonylamide)diphenylamine, bis(phenyl-isopropylidene)-4,4'-diphenylamine, N,N'-diphenyl-ethylenediamine, N,N'-diphenylpropylenediamine, octylated diphenylamine, N,N'-diphenyl-p-phenylenediamine and N-isopropyl-N'-phenyl-p-phenylenediamine.

The amount of the stabilizer is usually in the range of 0.01 to 5.0 parts by weight, preferably 0.05 to 2.5 parts by weight, based on 100 parts by weight of the conjugated diene polymer. When the amount of the stabilizer is too small, the effect of the antioxidant is not manifested and the polymer has poor heat-resistance. In contrast, when the amount of the stabilizer is too large, the conjugated diene polymer exhibits heat discoloration. The antioxidant may be used alone or as a combination of at least two thereof.

The stabilizer can be added simultaneously when the polymerization terminator is added, or can be added to rubber-like polymer solution after the addition of the polymerization terminator. When two or more kinds of stabilizers are used, they can be pre-mixed or added separately. The stabilizer may be compounded by using mixing machines such as single or twin screw extruder, Banbury mixer, roll and kneader; however, addition thereof after the polymerization step in polymerization process is preferable to prevent deterioration caused by heat-treatment in a drying process.

When a halogen-containing compound is used as a compound of a transition metal of group IV of the periodic table, it is preferable to neutralize the butadiene polymer solution. As a neutralizing agent to be compounded, there can be mentioned basic oxide of alkali metal or alkali earth metal, hydroxide of alkali metal or alkali earth metal, salt of strong alkali with weak acid, ammonia, or nitrogen-containing organic compound.

As specific examples of the basic oxide of alkali metal, there can be mentioned $Na_2O$, $K_2O$ and $Li_2O$. As specific examples of the basic oxide of alkali earth metal, there can be mentioned CaO, MgO and BaO. As specific examples of the hydroxide of alkali metal, there can be mentioned NaOH, KOH and LiOH. As specific examples of the hydroxide of alkali earth metal, there can be mentioned $Ca(OH)_2$, $Mg(OH)_2$ and $Ba(OH)_2$. As specific examples of the salt of strong alkali with weak acid, there can be mentioned $Na_2CO_3$, $K_2CO_3$ and $Li_2CO_3$, $CH_3COONa$, $CH_3COOK$ and $CH_3COOLi$. Examples of the nitrogen-containing organic compound are amines and nitrogen-containing hetero-cyclic compounds. As specific examples of the amines, there can be mentioned amino alcohols such as ethanolamine, N,N-diethylethanolamine, N,N-dimethyl-ethanolamine, N-methyl-N,N-diethanolamine, N,N-dibutyl-ethanolamine, N-methylethanolamine; ethylamine, diethylamine, triethylamine, 2-ethylhexylamine, di-2-hexyl amine, diisobutylamine, propylamine; ethyleneamines such as ethylenediamine, diethylenetriamine, triethylenetetraamine, tetraethylenepentaamine and pentaethylenehexaamine; cyclohexylamine, methylamine, dimethylamine, trimethylamine, diphenylamine, dibenzylamine, benzylamine, aniline, N-ethylaniline, N,N'-dimethylaniline and benzylethylaniline. As specific examples of the nitrogen-containing hetero-cyclic compounds, there can be mentioned pyridines, piperidine and piperazine. Of these, hydroxide of alkali metal or alkali earth metal, and salts of strong alkali with weak acid are preferable.

The amount of the neutralizing agent is preferably in the range of 0.1 to 10 equivalents, more preferably in the range of 0.3 to 5 equivalents, and most preferably in the range of 0.5 to 3 equivalents to halogen in the halogen-containing transition metal compound.

The procedure of recovering the conjugated diene polymer from a polymer solution using the above-mentioned catalyst is not particularly limited. For example, a steam-stripping procedure which is a conventional procedure for recovering a polymer from a rubber-like polymer solution can be used. A procedure to dehydrate and dry a butadiene polymer crumb after steam-stripping is not particularly limited. Conventional dehydration procedures can be used. As an example of the conventional procedure, there can be used a process in which the conjugated diene polymer crumb is separated from hot water using an oscillating screen, placed into compression water squeezer to reduce the water content in the crumb to 5 to 25% by weight, and is dried by extrusion dryer and/or hot air dryer to the water content of at most 1% by weight.

(iii) Modifier for Resin

The composition of the present invention for modifying a resin comprises as an effective ingredient the above-mentioned high-cis conjugated diene polymer rubber, and is useful as a modifier for enhancing the impact resistance of a resin, namely, as a toughening agent for a resin.

The composition of the present invention for modifying a resin may comprise, in addition to the above-mentioned high-cis conjugated diene polymer rubber, a rubber which is conventionally used as a toughening agent for a resin.

As specific examples of the rubber used as a toughening agent, there can be mentioned low-cis polybutadiene rubber, styrene-butadiene block copolymer rubber, styrene-butadiene random copolymer rubber, polyisoprene rubber and natural rubber. These rubbers may be used either alone or as a mixture of at least two thereof. The amount of the rubber used in addition to the above-mentioned high-cis conjugated diene polymer rubber, is preferably not larger than 40% by weight, more preferably not larger than 20% by weight and most preferably not larger than 10% by weight, based on the total weight of the high-cis conjugated diene polymer rubber composition of the invention.

The high-cis conjugated diene polymer rubber composition of the invention may comprises, in addition to the above-mentioned high-cis conjugated diene polymer rubber, ingredients which are conventionally used in the resin industry, according to the need. As examples of the ingredients, there can be mentioned mineral oils, fluid paraffin, organic polysiloxanes, organic and inorganic fillers, stabilizers, plasticizers, lubricants, ultraviolet absorbers, dyes, pigments, releasing agents, anti-static agents and flame-retardants. These ingredients may be used either alone or as a combination of at least two thereof. The amount of the ingredients may appropriately chosen provided that the object of the invention is achieved.

The organic and inorganic fillers include fibrous fillers and powdery fillers. As examples of the organic and inorganic fillers, there can be mentioned silica, diatomaceous earth, alumina, titanium oxide, magnesium oxide, ground pumice, pumice balloon, basic magnesium carbonate, dolomite, calcium sulfate, potassium titanate, barium sulfate, calcium sulfite, talc, clay, mica, asbestos, glass fiber, glass flake, glass beads, calcium silicate, montmorillonite, bentonite, graphite, aluminum powder, molybdenum sulfide, boron fiber, silicon carbide fiber, polyethylene fiber, polypropylene fiber, polyester fiber and polyamide fiber.

The flame-retardant used is not particularly limited and includes halogen-containing flame retardants. The halogen-containing flame retardants include chlorine-containing flame-retardants and bromine-containing flame-retardants. Of these, bromine-containing flame-retardants are preferable because of flame-retarding effect, thermal resistance at molding step, dispersibility in a resin and influence on properties of a resin. As specific examples of the bromine-containing flame-retardants, there can be mentioned hexabromobenzene, pentabromoethylbenzene, hexabromobiphenyl, decabromobiphenyl, hexabromodiphenyl oxide, octabromodiphenyl oxide, dacabromodiphenyl oxide, pentabromocyclohexane, tetrabromobisphenol-A and derivatives thereof such as tetrabromobisphenol-A-bis hydroxyethyl-ether), tetrabromobisphenol-A-bis(2,3-dibromopropyl-ether), tetrabromobisphenol-A-bis (bromoethyl-ether) and tetrabromobisphenol-A-bis(allyl-ether), tetrabromobisphenol-S and derivatives thereof such as tetrabromobisphenol-S-bis(hydroxyethyl-ether) and tetrabromobisphenol-S-bis(2,3-dibromopropyl-ether), tetrabromophthalic anhydride and derivatives thereof such as tetrabromphthalimide and ethylene-bistetrabromphthalimide, ethylene-bis(5,6-dibromonorbornene-2,3-dicarboxyimide), tris-(2,3-dibromopropyl-1)-isocyanurate, Diels-Alder reaction adduct of hexachlorocyolopentadiene, tribromophenyl glycidyl ether, tribromophenyl acrylate, ethylene-bis-tribromophenyl ether, ethylene-bis-pentabromophenyl ether, tetradecabromo-diphenoxybenzene, brominated polystyrene, brominated polyphenylene oxide, brominated epoxy resin, brominated polycarbonate, polypentabromobenzyl acrylate, octabromo-naphthalene, hexabromocyclododecane, bis(tribromophenyl)-fumaramide, and N-methylhexabromo-diphenylamine.

The amount of the flame-retardant is preferably in the range of 3 to 150 parts by weight, more preferably 10 to 140 parts by weight and most preferably 15 to 120 parts by weight, based on 100 parts by weight of the conjugated diene polymer.

To enhance the flame-retarding effect of the flame-retardant, a flame-retarding aid can be used, which includes antimony-containing compounds such as, for example, antimony trioxide, antimony pentoxide, sodium antimonate and antimony trichloride. The flame-retarding aid is preferably used in an amount of 1 to 30 parts by weight, more preferably 2 to 20 parts by weight, based on 100 parts by weight of the flame-retardant.

The mixing of the above-mentioned rubbers and other ingredients with the conjugated diene polymer rubber can be carried out by using various mixing or kneading apparatuses such as a single or twin screw extruder, a Banbury mixer, a roll or a kneader. The mixing can also be carried out by incorporating the ingredients in a polymerization mixture of the conjugated dione polymer rubber, and then coagulating the mixed solution to give a solid conjugated diene polymer rubber composition, followed by recovering.

(iv) Resin Composition

The resin composition of the present invention comprises (i) a resin as the basic ingredient, and (ii) the above-mentioned conjugated diene polymer rubber composition as a modifier for a resin.

The above-mentioned conjugated diene polymer rubber composition of the present invention can be used as a modifier for various resins. As specific examples of the resin to be modified, there can be mentioned thermosetting resins such as an epoxy resin, a xylene resin, a guanamine resin, a diallyl phthalate resin, a phenolic resin, unsaturated polyester resins, polyimide, polyurethane, a maleic acid resin, a melamine resin and a urea resin; polyaromatic vinyl resins such as an acrylonitrile-acrylate-styrene resin, an acrylonitrile-ethylene-styrene resin, an acrylonitrile-styrene resin, an acrylonitrile-butadiene-styrene resin, a polystyrene resin, a high-impact polystyrene resin and a methyl methacrylate-styrene resin: polyolefin resins such as poly-ethylene and polypropylene; and engineering plastics such as polyphenylene ether, polyamide, polycarbonate, polyacetal and polyesters. Of these, polyaromatic vinyl resins, unsaturated polyester resins and polyphenylene ether are preferable. Polyaromatic vinyl resins are especially preferable. These resins many be used either alone or as a combination of at least two thereof.

The proportion of the conjugated diene polymer rubber composition of the present invention to the resin is appropriately chosen depending upon the intended use of the resin composition, and the kind and amount of the conjugated diene polymer rubber in the modifier composition, and the amount of the conjugated diene polymer rubber in the composition for modifying the resin is preferably in the range of 0.1 to 30 parts by weight, more preferably 1 to 20 parts and most preferably 3 to 15 parts by weight, based on 100 parts by weight of the resin to be modified. When the amount of the conjugated diene polymer rubber is within this range, improvement of the impact resistance is large, and deterioration of good physical properties inherently possessed by the resin such as appearance characteristics such as luster and transparency, tensile strength and rigidity occurs only to a minor extent. Thus, the amount of the conjugated diene polymer rubber composition should appropriately be determined so that the amount of the conjugated diene polymer rubber in the composition is within the above-mentioned range.

The procedure by which the resin composition of the present invention is made is not particularly limited, and the conjugated diene polymer rubber composition and the resin may be mixed together by mechanical mixing means.

When the resin to be modified is a polyaromatic vinyl resin, the resin composition of the present invention can be made by polymerizing an aromatic vinyl monomer alone or a mixture of an aromatic vinyl monomer with a monomer copolymerizable therewith in the presence of the conjugated diene polymer rubber. As specific examples of the aromatic vinyl monomer, there can be mentioned styrene, o-methylstyrene, p-mathylstyrene, m-methylstyrene, 2,4-dimethylstyrene, ethylstyrene, p-tert.-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene and vinylnaphthalene. Of these, styrene is preferable. These aromatic vinyl monomers may be used either alone or as a combination of at least two thereof.

As specific examples of the monomer optionally copolymerizable with the aromatic vinyl monomer, there can be mentioned unsaturated nitriles such as acrylonitrile, methacrylonitrile and α-chloroacrylonitrile, acrylic acid ester monomers such as methyl acrylate, methacrylic acid ester monomers such as methyl methacrylate, unsaturated fatty acid monomers and anhydrides thereof such as acrylic acid, methacrylic acid and maleic anhydride, and phenylmaleimide. Of these, unsaturated nitrile monomers, acrylic acid ester monomers, methacrylic acid ester monomers, and unsaturated fatty acid monomers are preferable. Unsaturated nitrile monomers are especially preferable. These monomers to be copolymerized with the conjugated diene monomer may be used either alone or as a combination of at least two thereof.

The proportion of the aromatic vinyl monomer to the copolymerizable monomer can be varied depending upon the particular use of the resin composition. But, the ratio by weight of the aromatic vinyl monomer to the copolymerizable monomer is preferably in the range of 20/80 to 100/0, more preferably 40/60 to 100/0, and most preferably 60/40 to 100/0.

The process of polymerization for the production of the polyaromatic vinyl resin is not particularly limited. Usually the polymerization is carried out by a free-radical polymerization process, and any type of polymerization procedure can be employed which includes, for example, bulk polymerization, solution polymerization, suspension polymerization and multi-stage polymerization such as bulk-suspension two stage polymerization. A bulk polymerization procedure, especially a continuous bulk polymerization procedure, is preferable.

In the case when a continuous bulk polymerization procedure is employed for the production of the polyaromatic vinyl resin composition, for example, the conjugated diene polymer rubber composition of the invention is dissolved in an aromatic vinyl monomer or a mixture of an aromatic vinyl monomer with a monomer copolymerizable therewith, and according to the need, other ingredients such as a diluent, an internal lubricant such as fluid paraffin or mineral oil, an antioxidant and a chain transfer agent. When a catalyst is not used, the polymerization is carried out at a temperature of 80 to 200° C. When a catalyst is used, the polymerization is carried out at a temperature of 20 to 200° C. in the presence of a catalyst. The polyaromatic vinyl resin composition of the invention is preferably carried out in the presence of a catalyst. When the conversion of the monomer, i.e., an aromatic vinyl monomer or a mixture thereof with a copolymerizable monomer, reaches at least 60% by weight, more specifically 60 to 90% by weight, the polymerization is terminated.

The polymerization catalyst used is suitably selected depending upon the particular type of polymerization procedure. In the case of free-radical polymerization, an organic peroxide catalyst or an azo catalyst is used. An organic peroxide is preferable. As specific examples of the organic peroxide catalyst, there can be mentioned peroxy-ketals such as 1,1-bis(t-butylperoxy)cyclohexane and 1,1-bis(t-butylperoxy)-8,3,5-trimethylcyclohexane, dialkyl peroxides such as di-t-butyl peroxide and 2,5-dimethyl-2,5-di(t-butylperoxy)hexane, diacyl peroxides such as benzoyl peroxide and m-toluoyl peroxide, peroxycarbonates such as dimethylstyryl peroxydicarbonate, peroxyesters such as t-butyl peroxyisopropylcarbonate, ketone peroxides such as cyclohexanone peroxide, and hydroperoxides such as p-pentanehydroperoxide. These polymerization catalysts may be used either alone or as a combination of at least two thereof. The amount of the polymerization catalyst is preferably in the range of 0.001 to 5 parts by weight, more preferably 0.005 to 3 parts by weight and most preferably 0.01 to 1 part by weight, based on 100 parts by weight of the monomer.

As specific examples of the diluent, there can be mentioned aromatic hydrocarbons such as benzene, toluene, xylene and ethylbenzene; alicyclic hydrocarbons such as cyclohexane, methylcyclohexane and cyclopentane; aliphatic hydrocarbons such as n-heptane, n-hexane and n-heptane; and ketones such as methyl iospropyl ketone. Of these, aromatic hydrocarbons are preferable. These diluents may be used either alone or as a combination of at least two thereof. The amount of the diluent is preferably 0 to 25% by weight based on the total weight of the monomer.

As specific examples of the chain transfer agent, there can be mentioned mercaptanes such as n-dodecylmercaptane and t-dodecylmercaptane; terpenes such as 1-phenylbutyl-2-fluorene and dipentene; halogen compounds such chloroform; and α-methylstyrene dimer.

After completion of the polymerization procedure, a conventional procedure is employed for recovery of the resin composition, for example, a solvent is removed by heating the thus-produced resin composition under reduced pressure, or a solvent and unreacted monomer are removed by extruding the resin composition through an extruder equipped with vent means for the removal of volatiles. The resin composition is pelleted or powdered for use according to the need.

In the case of bulk-suspension polymerization, a first-stage polymerization is carried out by a procedure similar to a bulk polymerization procedure until the conversion reaches a value in the range of 30 to 50% by weight, and then, a suspension stabilizer such as polyvinyl alcohol or carboxymethylcellulose and/or a surface active agent such as sodium dodecylbenzenesulfonate is incorporated in the thus-partially-polymerized reaction mixture, followed by a second-stage polymerization is effected by a procedure similar to a suspension polymerization procedure to complete the polymerization. The thus-produced high-impact resin composition is isolated, for example, by means of filtration or centrifugal separation, and washed with water and then dried. According to the need, the recovered resin composition is pelleted or powdered.

The particle size of the high-cis conjugated diene polymer rubber and other optional rubbers is not particularly limited, but is preferably in the range of 0.01 to 10 $\mu$m, more preferably 0.1 to 5 $\mu$m and most preferably 0.5 to 3 $\mu$m in view of the enhanced impact resistance.

The present invention will now be described more specifically by way of examples and comparative examples. In these working examples, parts and % are by weight unless otherwise specified. Evaluation of various properties were made according to the following methods.

(1) Weight Average Molecular Weight (Mw) and Number Average Molecular Weight (Mn)

The weight average molecular weight (Mw) and the number average molecular weight (Mn) were determined by using HLC-8020 gel permeation chromatography supplied by tosoh Corp. under the following conditions: two columns connected-in-series (GMH-XL supplied by Tosoh Corp.), column temperature: 40° C., eluate: tetrahydrofuran, elution rate: 1.0 ml/min., sample concentration: 8 mg/20 ml(tetrahydrofuran). The molecular weight was determined from a calibration curve drawn by using a standard polybutadiene specimen.

(2) Microstructure (Cis-1,4-Bond Content) of Polybutadiene

The microstructure of polybutadiene was determined by NMR analysis as follows. The content of cis-1,4-bond in the polymer was determined by $^1$H-NMR analysis (1,4-bond: 5.4–5.6 ppm, 1,2-bond: 5.0–5.1 ppm). The content of cis-bond was calculated from $^{13}$C-NMR (cis: 28 ppm, trans: 38 ppm), thus determining the cis-1,4-bond content in the total polymer.

(3) Low-Temperature IZOD Impact Resistance of Polystyrene Resin

Low-temperature IZOD impact resistance of a polystyrene resin was measured at a temperature of −30° C. according to JIS K7110, and the results were expressed as a relative index assuming the corresponding result obtained in Comparative Example 1 had an index of 100. As the relative index value is larger, the low-temperature impact resistance is larger and becomes more preferable.

(4) Surface Luster

The surface luster was measured at an incident angle of 60° according to JIS Z8741 and the results were expressed as a relative index assuming the corresponding result obtained in Comparative Example 1 had an index of 100. As the relative index value is larger, the surface luster is larger and becomes more preferable.

Synthesis of (2-methoxycarbonylmethyl) cyclopentadienyl-trichlorotitanium MeO(CO)CH$_2$CpTiCl$_3$ A solution of 30.6 g (200 mmol) of methyl bromoacetate in 100 ml of tetrahydrofuran was gradually dropwise added to a solution of 32 g (200 mmol) of trimethylsilylcyclopentadienyl-sodium in 400 ml of tetrahydrofuran in an argon atmosphere at −78° C. After completion of the addition, the reaction mixture was further maintained at −78° C. overnight with stirring. Then tetrahydrofuran was distilled off under a reduced pressure, and the obtained solid was filtered off and subjected to vacuum distillation (65–66° C./3 mmHg) to yield about 30 g of (2-methoxycarbonyl- methyl) trimethylsilylcyclopentadienyl [TMSCpCH$_2$COOMe]. Yield: 70%. The chemical structure was confirmed by $^1$H-NMR.

$^1$H-NMR (ppm, TMS, CDCl$_3$): 6.55–6.20(m, hydrogen connected to carbon constituting double bond in cyclopentadiene), 3.5–3.35(m, hydrogen connected to carbon constituting double bond in cyclopentadiens), 3.15–2, 98(m. hydrogen connected to carbon constituting double bond in cyclopentadiene), 3.69 (s, 2H), 3.67( s, 3H), −0,22(s, 9H).

To a solution of 4.2 g (20 mmol) of (2-methoxy-carbonylmethyl)trimethylsilylcyclopentadienyl in 100 ml of dry methylene chloride, 3.8 g (20 mmol) of titanium tetrachloride was added at 0° C. in an argon atmosphere. The mixture was stirred at room temperature for 3 hours. The reaction mixture was cooled to −30° C. to precipitate 4.0 g of orange crystal. Yield: 70%. The product was identified as 2-methoxycarbonylmethyl)cyclopentadienyl-trichlorotitanium by $^1$H-NMR analysis.

$^1$H-NMR (ppm, TMS, CDCl$_3$): 7.05(s, 4H), 3.92(s, 2H), 3.76(s, 3H)

EXAMPLE 1

Butadiene Polymer A

To a solution in toluene of 12.2 mmol of methylaluminoxane (supplied by Tosoh-Akzo Co.), a solution in toluene of 0.0122 mmol of the 2-methoxycarbonylmethyl) cyclopentadienyl-trichlorotitanium (MeO(CO)CH$_2$CpTiCl$_3$, hereinafter abbreviated to "TiES") was added dropwise, and the mixture was kept aging at −25° C. for 1 hour. A sealable pressure-resistant glass ampoule having an inner volume of 150 ml was charged with 52.4 g of toluene and 5.5 g of butadiene in a nitrogen atmosphere, and the content was kept at 0° C. Then, the above-mentioned aged catalyst was added to the ampoule, butadiene was polymerized at 0° C. for 5 minutes, Thereafter a small amount of an aqueous acidic methanol was added to terminate the polymerization. The polymerization mixture was poured in a large amount of acidic methanol to precipitate a white solid. The solid was filtered off and dried to yield a butadiene polymer A. The yield of polymer was 75% by weight.

The content of the cis-bond in the butadiene polymer A was 92%. The weight average molecular weight (Mw) was 1,283,000. The ratio of the weight average molecular weight (Mw) to the number average molecular weight (Mn) was 1.41. It was confirmed that log(Mw/Mn)=0.149 and [0.162×log(Mw)−0.682]=0.308, and thus, "log(Mw/Mn)<0.162×log (Mw)−0.682" was satisfied, Polystyrene Resin Composition A stainless steel reactor equipped with a stirrer was charged with a solution of 180 g of butadiene polymer A in 1,820 g of a styrene monomer, and then 250 ppm of n-dodecylmercaptane (chain transfer agent) based on the weight of the styrene monomer. The content was maintained at 130° C. with stirring for one hour and 20minutes to conduct a bulk polymerization. Then the content was taken, and 1,250 g of the taken content and 3,750 g of an aqueous 2% solution of polyvinyl alcohol were charged into a 8-liter stainless steel reactor equipped with a stirrer. The content in the reactor was heated to 70° C. Then 2.5 g of benzoyl peroxide and 1.26 g of dicumyl peroxide were added into the reactor, and the content was maintained at 70° C. for one hour, 90° C. for one hour, 110° C. for one hour and further 130° C. for 4 hours to conduct a polymerization. After completion of the polymerization, the reaction mixture was cooled to room temperature. The thus-obtained high-impact polystyrene resin composition was filtered for recovering, washed with water, and then dried at 60° C. for 6 hours under a reduced pressure.

Then the polystyrene resin composition was kneaded by rolls at 180° C. to give a sheet and the sheet was pelleted by a sheet pelletizer. The pellet was used for evaluation of low-temperature impact resistance and surface luster. The evaluation results are shown in Table 1.

Comparative Example 1

According to the same procedure as described in Example 1, except that the butadiene polymer A was replaced by a commercially available butadiene polymer (UBEPOL-BR 150L, supplied by Ube Ind., Mw: 493,000, Mw/Mn: 2.53, cis content: 95.1%, log(Mw/Mn): 0.403, [0.162×log(Mw)−0.682]=0.240), a polystyrene resin composition was prepared. The results for evaluation of low-temperature impact resistance and surface luster of the polystyrene resin composition are shown in Table 1. The micro structure (cis-1, 4-bond content), weight average molecular weight (Mw), number average molecular weight (Mn) and molecular weight distribution (Mw/Mn) of the raw material rubber are also shown, together with the properties of butadiene polymer A, in Table 1.

TABLE 1

|  | Example 1 | Comparative Example 1 |
| --- | --- | --- |
| Butadiene polymer | A | Ubepol-BR150L |
| Cis-1,4-bond content (%) | 92 | 95 |
| Weight average molecular weight (MW) | 1,283,000 | 288,000 |
| Molecular weight distribution Mw/Mn | 1.41 | 2.53 |
| log (Mw/Mn) | 0.149 | 0.403 |
| 0.162 × log(Mw) − 0.682 | 0.308 | 0.202 |
| Amount of butadiene polymer rubber parts per 100 parts of resin composition | 9 | 9 |
| Low-temperature IZOD impact resistance | 123 | 99 |
| Surface luster | 128 | 105 |

Industrial Applicability

The resin composition comprising (i) the high-cis conjugated diene polymer rubber composition of the present invention as a modifier for a resin and (ii) a resin gives a shaped article having balanced low-temperature impact resistance and surface luster.

A polyaromatic vinyl resin composition prepared by polymerizing an aromatic vinyl monomer alone or a mixture thereof with a copolymerizable monomer in the presence of the high-cis conjugated diene polymer rubber composition exhibits balanced high-impact resistance and surface luster and can be easily produced.

Therefore, the resin composition comprising the high-cis conjugated diene polymer rubber composition of the present invention as a modifier for resin, and a resin is useful as a resin article which possesses good impact resistance, especially good low-temperature resistance and surface luster in addition to the properties inherently possessed by the resin.

What is claimed is:

1. A resin composition comprising (I) a resin ingredient and (II) a conjugated diene polymer rubber composition; said conjugated diene polymer rubber composition (II) comprising a conjugate diene polymer having a high cis-bond content, which is a polymer of conjugated diene monomer or monomers alone or a copolymer of a conjugated diene monomer with a monomer copolymerizable therewith, and in which the content of units having a cis-bond in the total units derived from the conjugated diene monomer is at least 40%; the weight average molecular weight (Mw) is in the range of 20,000 to 10,000,000; the ratio (Mw/Mn) of weight average molecular weight (Mw) to number average molecular weight (Mn) is smaller than 1.5; and the ratio (Mw/Mn) and the weight average molecular weight (Mw) satisfy the following formula (1):

$$\log(Mw/Mn) < 0.162 \times \log(Mw) - 0.682 \qquad (1).$$

2. The resin composition according to claim 1, wherein at least 40% by weight of the conjugated diene polymer is composed of a conjugated diene unit.

3. The resin composition according to claim 1, wherein the conjugated diene monomer is selected from the group consisting of 1,3-butadiene, 2-methyl-1,3-butadiene, 2,3-dimethyl-1,3-butadiene, 2-chloro-1,3-butadiene, 1,3-pentadiene and 1,3-hexadiene.

4. The resin composition according to claim 1, wherein the polymer rubber composition (II) further comprises not larger than 40% by weight, based on the total weight of the polymer rubber composition (II), of a rubber other than the conjugated diene polymer having a high cis-bond content.

5. The resin composition according to claim 1, wherein the content of the polymer rubber composition (II) is in the range of 0.1 to 30 parts by weight, based on 100 parts by weight of the resin ingredient (I).

6. The resin composition according to claim 1, wherein said conjugated diene polymer having a high cis-bond content is in the form of particles having an average particle diameter of 0.01 to 10 $\mu$m and is dispersed in a matrix comprised of the resin ingredient (I).

7. The resin composition according to claim 1, wherein the resin ingredient (I) is a polyaromatic vinyl resin.

8. The resin composition according to claim 7, wherein the polyaromatic vinyl resin is a homopolymer of an aromatic vinyl monomer or a copolymer of an aromatic vinyl monomer with a monomer copolymerizable therewith.

9. The resin composition according to claim 8, which is produced by a process comprising dissolving the polymer rubber composition (II) in an aromatic vinyl monomer or a mixture of an aromatic vinyl monomer with a monomer copolymerizable therewith, and then polymerizing the aromatic vinyl monomer or the aromatic vinyl monomer mixture.

* * * * *